United States Patent [19]

Sherman et al.

[11] Patent Number: 4,554,499
[45] Date of Patent: Nov. 19, 1985

[54] COMPUTER CONTROLLED MOTOR

[75] Inventors: Leonard H. Sherman, Sunnyvale; James R. Swartz, San Mateo; James M. Williams, Palo Alto, all of Calif.

[73] Assignee: Genentech, Inc., So. San Francisco, Calif.

[21] Appl. No.: 664,110

[22] Filed: Oct. 24, 1984

Related U.S. Application Data

[63] Continuation of Ser. No. 491,115, May 3, 1983, abandoned.

[51] Int. Cl.$^4$ .............................................. H02P 8/00
[52] U.S. Cl. .................................... 318/696; 318/685; 137/3
[58] Field of Search ..................... 318/696, 685; 137/3

[56] References Cited

U.S. PATENT DOCUMENTS

| | | | |
|---|---|---|---|
| 3,309,507 | 3/1967 | Schlein | 235/150.1 |
| 3,475,392 | 10/1969 | McCoy et al. | 260/83.7 |
| 3,504,362 | 3/1970 | Feldmann | 340/347 |
| 3,566,240 | 2/1971 | Okamota | 318/600 |
| 3,729,624 | 4/1973 | Hopkins et al. | 235/151.12 |
| 3,751,644 | 8/1973 | Mayer | 235/151.12 |
| 4,016,079 | 4/1977 | Severin | 210/96 R |
| 4,066,092 | 1/1978 | Dulger et al. | 137/93 |
| 4,144,804 | 3/1979 | O'Keefe et al. | 99/452 |
| 4,176,052 | 11/1979 | Bruce et al. | 208/131 |
| 4,292,577 | 9/1981 | Cesarz et al. | 318/802 |
| 4,313,075 | 1/1982 | Stewart et al. | 318/722 |

FOREIGN PATENT DOCUMENTS 2415526 10/1975 Fed. Rep. of Germany .

OTHER PUBLICATIONS

Design Engineer's Guide to DC Stepping Motors, The Superior Electric Co., 1976.
Check et al., "Programmable Stepper Motor Control", IBM Technical Disclosure Bulletin, vol. 17, No. 11, Apr. 1975.
J. C. King, "IBM Technical Disclosure Bulletin", 22(7), 2901-2902, (Dec. 1979).

Primary Examiner—William M. Shoop, Jr.
Assistant Examiner—Saul M. Bergmann

[57] ABSTRACT

To control a motor, a pulse width modulated signal from a computer is fed to a capacitor which stores each pulse as a voltage proportional to the width of the pulse, the capacitor being reset to zero by a leading edge reset circuit. The voltage on the capacitor is sampled by a sample/hold circuit the output of which is fed to a converter which converts the voltage signal to a frequency signal exponentially related to the voltage, and hence to the pulse width. The converter then powers a driver which drives the motor. The exponential relationship between the pulses and the signal fed to the motor permits a large variation in the frequency signal based on a small variation in pulse width and hence permits accurate control of the motor.

14 Claims, 4 Drawing Figures

0## COMPUTER CONTROLLED MOTOR

This is a continuation of application Ser. No. 491,115 filed May 3, 1983, now abandoned.

BACKGROUND OF THE INVENTION

This invention relates to a method and apparatus for controlling the speed of a motor. In particular, the invention relates to using a command signal to control motor speed through an exponential relationship between the signal and the desired speed.

There are a number of instances in which it is desirable to maintain a predetermined speed of a motor. This motor may be used to drive, for example, a vehicle, a conveyor belt, or a robotic component of a mechanized factory system. Motors are presently available which are capable of maintaining constant speed, however, this characteristic is not ordinarily compatible with the ability to select over a wide range of constant speeds. The present invention provides a means whereby a preselected motor speed can be maintained within narrow limits and wherein this speed may be chosen over a wide range of possible RPMs.

A particularly demanding application is that wherein the motor is used to drive a pump, which pump supplies a fluid for, for example, a chemical reaction or for a fermenter. Many modern industrial processes in the chemical or bio-engineering fields involve mixing of fluid constituents to form solutions of one type or another. The mixing is generally accomplished by pumping the fluid constituents into production vessels under carefully regulated conditions. The fluid pumps are driven by pump motors controlled to provide the fluid flow rates optimally associated with the processes. Conventional pump motor control techniques often rely on signals which are generated in response to process sensor outputs and which exhibit control voltages proportional to the optimal or desired fluid flow rates. The control voltages are converted into control frequencies suitable for use in driving the pump motors at the speeds required to establish the desired fluid flow rates. The ability of such prior art pump motor control techniques to provide accurate control over the amount of a given fluid admitted to a production vessel depends to a great extent on the nature of the control voltage-to-frequency conversion function. Many prior art pump motor controllers employ linear conversion functions, whereby the sensitivity of the pump motor control circuitry to indicated changes in the desired flow rate remains constant over the entire range of flow rates available to the pump.

Many industrial processes can be affected greatly by even small changes in the quantities of constituent fluids admitted to the production vessels. In order to maintain proper pH levels in a fermentation culture, for example, a base or acid must be supplied to the culture in precisely measured amounts at rates which vary continuously in accordance with the measured pH level of the culture. The linear conversion function for process control signals in existing pumps does not yield the pump motor speed resolution necessary to achieve fine control over base or acid supply at the low flow rates typically encountered during fermentation pH level adjustments. Under these circumstances, it would be particularly beneficial to provide a pump motor controller capable of performing control voltage-to-frequency conversions, in a manner which permits high resolution of pump motor speed settings at low fluid flow rates. The present invention offers just such an advantage.

SUMMARY OF THE INVENTION

This invention relates to an apparatus for driving a motor at a desired motor speed which operates by translating a command signal applied by the operator into a control signal which regulates the motor speed, and where the control signal is exponentially related to the command signal. Typically, the command signal is a digital pulse of a characteristic pulse width, and the control signal is a frequency, and tne frequency is thus an exponential function of the pulse width. The exponential relationship permits a large variation in the control signal based on a limited adjustment of the command signal, and hence gives a high degree of control over the speed of the motor. The invention is also directed to a method of controlling motor speed using the apparatus of the invention.

BRIEF DESCRIPTION OF THE DRAWINGS

The various features, objects and advantages of the present invention will become more apparent upon consideration of the following Brief Description of the Drawings and the Preferred Mode for Carrying Out the Invention, wherein.

DETAILED DESCRIPTION

Figure 1:
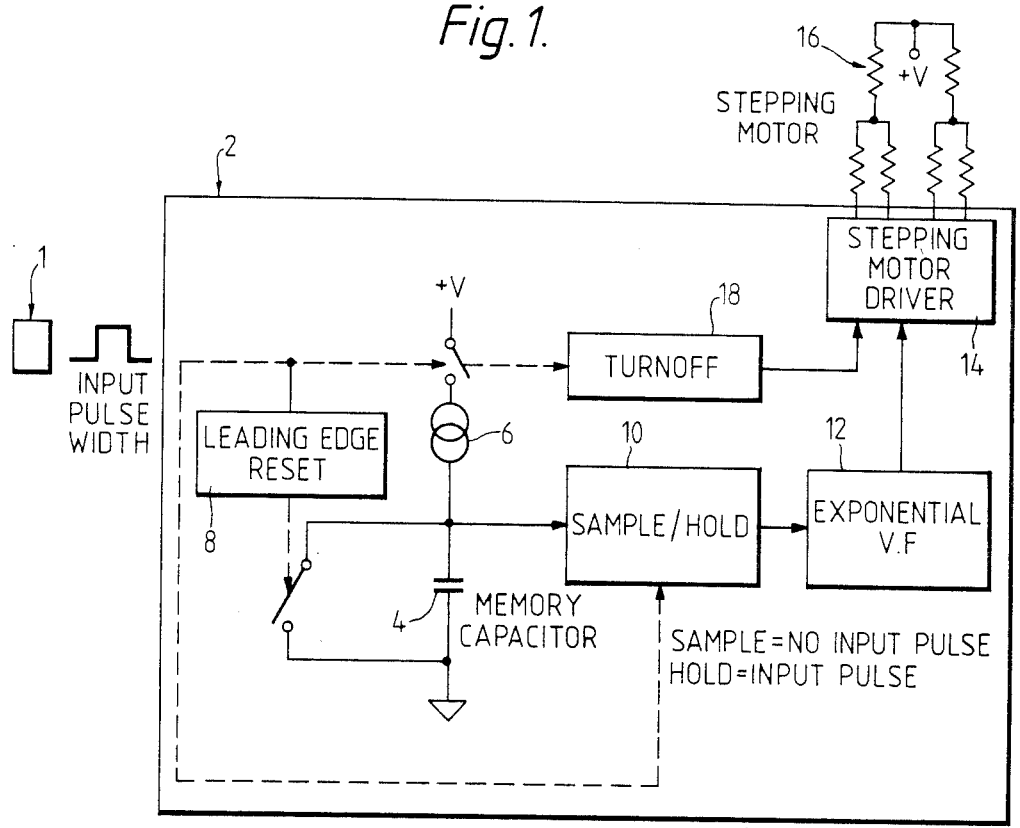
FIG. 1 is a block diagram of the pump control circuitry.

The motor speed control system of the present invention is designed to translate a modulated command signal, having a command cnaracteristic (i.e., a preselected component of the command signal, such as a pulse width or a voltage level), into a motor control signal having a frequency exponentially related to the command signal characteristic. The motor control signal may then be employed to operate the motor at a speed which varies directly as a function of the control signal frequency. The relationship between tne characteristic of the command signal and tne frequency of the control signal is exponential—i.e., stated in converse terms, the command characteristic is a logarithmic function of the control signal frequency. In formal terms, this results in an equation of the form or, in converse form $$\text{Control} = K_a 10^{K_b} \text{ command}$$

$$\log \frac{\text{control}}{K_a} = K_b \times \text{command}$$

Of course, the control signal must be compatible with the nature of the motor which it is designed to control. If the motor used is a "stepping motor", the motor operates by virtue of a pulsed DC current wherein the rotating segment of the motor turns in response to a positive pulse and stops when the pulse is no longer applied. Therefore in this case, an appropriate control signal is a pulsed DC current the frequency of which is directly proportional to the motor speed. If an AC motor is used, ordinarily the control signal is an alternating current applied to the coils; in that case the control signal is the frequency of the AC current, which is proportional to the motor speed.

An appropriate command signal is a digital pulse generated by computer wherein the pulse width characterizes the command; the pulse width is that characteristic of the pulse width which is translated into the desired control signal.

While there are many situations wherein it is desirable to control motor speed with some precision, and to have the ability to do so over a wide range of speeds, a particularly useful application is that wherein the motor is used to drive a pump, and it is desired to control the flow rate of materials flowing through the pump. In that case, the pump must be calibrated so as to generate a calibration curve which relates flow rate for a particular material to motor speed. The method of the invention is designed solely to control the speed of the motor, and does not necessarily include a feedback loop which reads on flow rate. Instead, the method of the invention can be used based on independent parameters which dictate a desired flow rate.

For example, if the pump is used to supply nutrients to a microbial culture in a fermenter, it may be desirable to increase the level of nutrients as the organisms grow in response to previously added nutrients. Thus, the quantity of cells, as assessed oy, for example, optical density measurements, measurements of carbon dioxide output or oxygen uptake or other suitable means can be used to ascertain the desirable flow rate, and the calibrated characteristics of the pump with respect to that particular nutrient solution integrated into the system so as to define an appropriate aotor speed. In this case, for example, the pulse width of the command signal could be set depending on the light absorbing capability of the culture. This pulse width then, for example, could be translated into a voltage, tne magnitude of which is a linear function of the pulse width, and this voltage translated into a frequency which is exponentially related to the voltage amplitude.

The following detailed description of a preferred mode sets forth in detail the application of the method of the invention to a particular system and is designed to illustrate, but not to limit tne scope of the invention.

PREFERRED MODE FOR CARRYING OUT THE INVENTION

In a preferred embodiment, the apparatus and method of the present invention are designed to translate a pulse width modulated command signal from a computer into voltage and then to a motor control signal having a frequency exponentially related to the command signal width. The motor control signal may then be employed to operate a stepping motor at a speed which varies as a direct function of the control signal frequency. The stepping motor, in turn, drives a peristalic pump head to provide the pumping action necessary for delivering metered amounts of fluid to a utilization site. The exact relationship between pulse width of the command signal and the frequency of the motor control signal can be expressed as an exponential transfer function. Such a relationship permits high resolution speed settings at very low pumping rates, while simultaneously providing for a wide range of speed settings. The relationship between computer-generated command signal and the pump flow rate can be expressed as follows:

$$R(ml/min) = K_1 \times 10^{K_2 t} \quad (1)$$

where R represents the ultimate pump flow rate expressed in ml/min, t represents the pulse width of the command signal in minutes, and $K_1$ and $K_2$ are calibration constants which may be adjusted to fit the particular pump, motor and control circuit characteristics of the system. Solving Equation (1) for pulse width yields:

$$t = \frac{1}{K_2} \log(R/K_1), \text{ or} \quad (2)$$

$$t = \frac{1}{2.3026} \times \frac{1}{K_2} \ln \frac{R}{K_1} \quad (3)$$

Equation (3) is the actual equation used by the computer to determine the pulse width of the command signal to be fed to the pump controller for any desired pump rate.

Using appropriate software, the computer generates a command signal in the form of a pulse train having pulse widths which vary logarithmically as a function of the desired fluid flow rate. A memory capacitor in the analog motor controller is connected to receive the command signal from the computer. A leading edge reset circuit in the analog motor controller is triggered by the leading edge of each incoming command signal to discharge the memory capacitor and initiate each stepping motor control cycle. The memory capacitor subsequently recharges to a voltage level indicative of the width of the incoming command signal pulse. This voltage level is sampled by a sample/hold circuit and fed to a voltage-to-freqency converter where an exponential transfer function is perforaed to derive a control signal having a frequency proportional to the desired fluid flow rate. The control signal is in turn directed to a stepping motor at a speed proportional to the control signal frequency, thereby operating the pump at the desired fluid flow rate. Pump shutdown can be initiated by instructing the computer to generate command signals with abnormally long pulses. A turnoff circuit in the analog pump controller detects the abnormal pulse widths in the incoming command signal and disconnects the stepping motor driver from the pump stepping motor to complete the pump shutdown procedure.

Turning to FIG. 1, the pump controller can be seen in block diagram form. Pump controller 2 basically includes a memory capacitor 4 connected to a switchable current source 6, a leading edge re-set circuit 8 connected across memory capacitor 4, a sample/hold circuit 10 for measuring the voltage on the memory capacitor, an exponential-frequency-converter 12, which performs a frequency conversion on the voltage measured by sample/hold circuit 10, and a stepping motor driver 14, which drives a stepping motor 16 with a series of incremental steps in response to the output of voltage-to-frequency converter 12. The leading edge of each incoming command signal pulse trips the leading edge reset 8 to complete a circuit across memory capacitor 4, dissipating any residual voltage otherwise present on the capacitor. Shortly thereafter, the command signal pulse gates current source 6, and memory capacitor 4 is linearly charged for the duration of the command signal pulse width. The sample/hold circuit 10 operates in the "hold" mode while capacitor 4 is charging, preventing the voltage-to-frequency converter from sensing the capacitor ramping action. When the command signal pulse ceases, the voltage on memory capacitor 4 remains essentially stable for a period sufficient to permit the measurement thereof by sample/hold circuit 10, which retains this valve. The voltage-to-frequency converter 12 receives the voltage measured by sample/hold circuit 10 and generates the aforementioned motor control signal in the form of a pulse train having a frequency exponentially related to the voltage at the sample-hold current output. The motor control signal is used by the stepping motor driver 14 to drive stepping motor 16 at a rate which likewise varies exponentially with the sample hold circuit output, and hence at a rate exponentially related to the pulse width of the command signal output by the computer, thereby satisfying the constraints of Equations (1)–(3). If desired, the computer can be programmed to output a command signal pulse having an abnormally long width whenever the pump is to be disabled. The abnormally long pulse width energizes a turnoff circuit 18 to cut off the stepping motor drive current output from stepping motor driver 14.

Figure 2A:
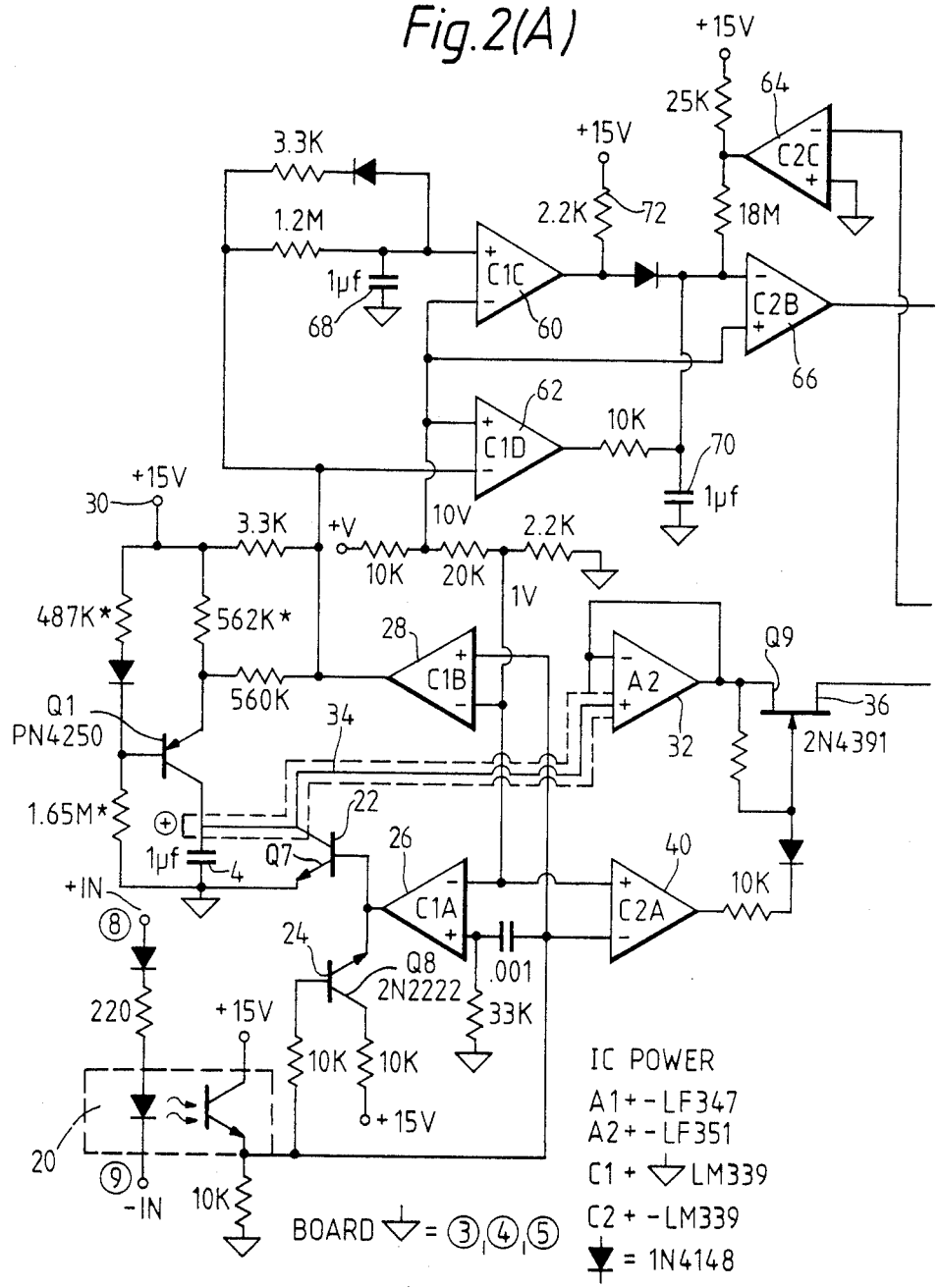
FIG. 2a and 2b is a detailed circuit schematics of the pump controller illustrated in FIG. 1.
Figure 2B:
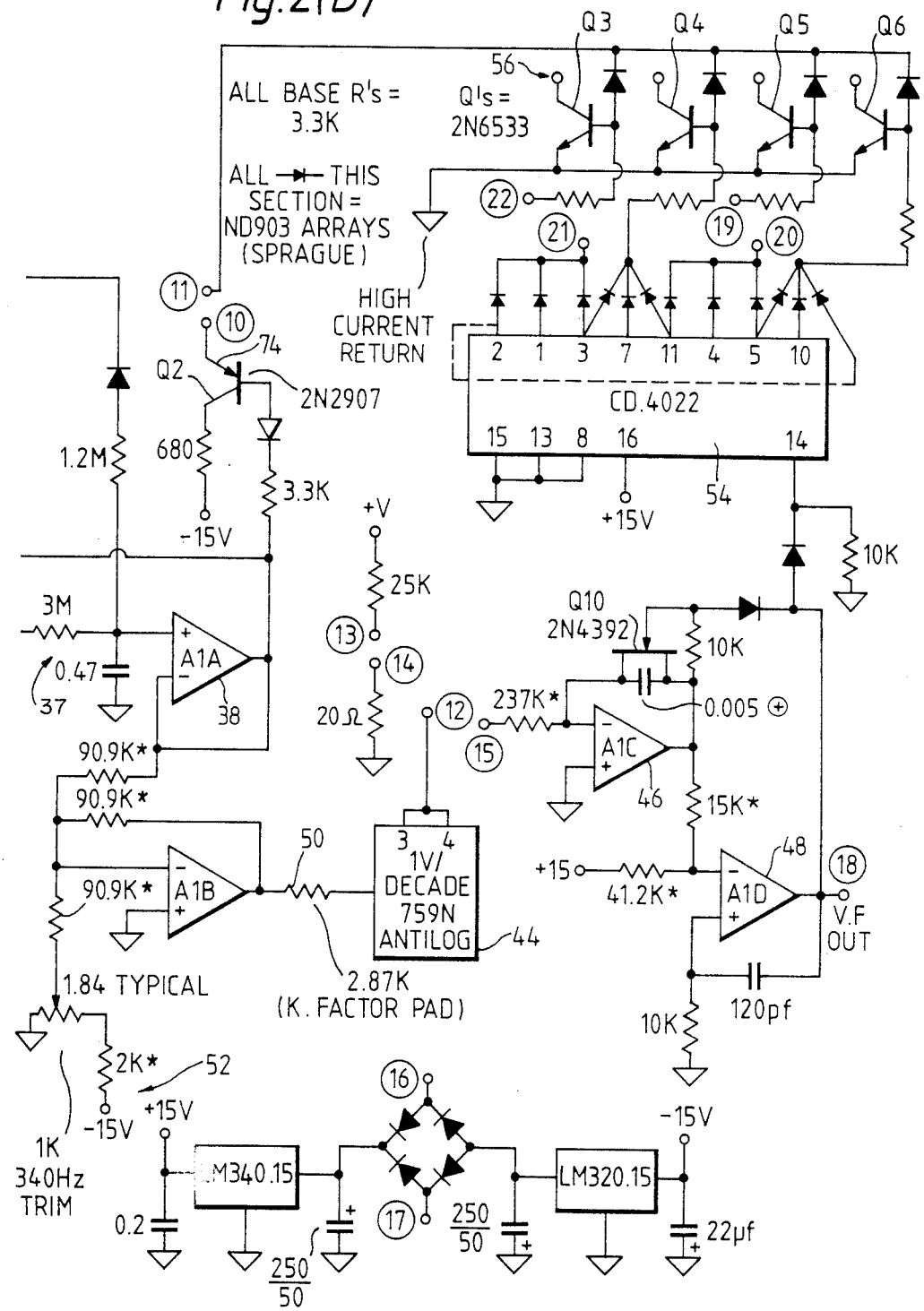

A detailed circuit diagram of the pump controller can be seen in FIGS. 2A–2B. The incoming command signal pulses are received by an opto-isolator 20. The use of the opto-isolator eliminates ground loop and data line noise pick-up problems. In response to each incoming command signal pulse, the opto-isolator supplies an output which first activates leading edge reset 8. The leading edge reset in particular comprises and n-p-n transistor 22 connected across memory capacitor 4, a bias current source in the form of a second n-p-n transistor 24 connected to the base of transistor 22, an a differential comparator 26 for controlling the flow of current from transistor 24 to the base of transistor 22. The positive input of differential amplifier 26 is tied to the emmiter output of opto-isolator 20. Hence, the rise in the opto-isolator output appearing at the leading edge of each incoming command signal pulse causes the differential comparator itself to output a short pulse. Because the differential comparator is an open collector device, the short pulse differential comparator output momentarily results in the flow of current from the base of transistor 22 through transistor 24, biasing transistor 22 on to discharge memory capacitor 4. Once the short pulse output from differential comparitor 25 has ended, the bias on transistor 22 is removed and transistor 22 shut off to permit recharging of the memory capacitor. It should here be noted that the base bias for transistor 24 is supplied by the opto-isolator output which reaches the positive input of differential amplifier 26. This circuit configuration guarantees that severe noise disturbances otherwise producing a short output pulse from differential amplifier 26 will not result in re-setting capacitor 4, inasmuch as transistor 24 can only provide current for transistor 22 when an actual command signal pulse is present at the opto-isolator.

In addition to feeding the positive input of differential amplifier 26 in leading edge re-set circuit 8, the output from the opto-isolator 20 is connected to the positive input of an amplifier which serves as the gate for current source 6. Current source 6 specifically comprises a p-n-p transistor connected to supply memory capacitor 4 with charge from a voltage supply 30. When transistor 22 turns off at the end of the short pulse output from differential comparitor 26, memory capacitor 4 immediately begins to ramp up to a voltage level determined by the width of the incoming command signal pulse reaching opto-isolator 20. When the output from the opto-isolator drops at the falling edge of the incoming command signal pulse, amplifier 28 switches low to draw off current from voltage supply 30, gating current supply 6 off in preparation for the measurement of voltage across the memory capacitor 4. The memory capacitor is actually unloaded by a follower amplifier 32 in sample/hold circuit 10 via lead 34. The output of follower amplifier 32 feeds through transistor 36 to amplifier 38 in the sample/hold circuit 10. The base of transistor 36 is tied to amplifier 40 in the sample/hold circuit, the negative input of which amplifier receives the output from opto-isolator 20. During the ramp-up interval of memory capacitor 4, the opto-isolator output which triggers amplifier 28 to gate current source 6 on simultaneously switches the output of amplifier 40 low, shutting off transistor 36 to maintain the output of amplifier 38 at a quiescent level. In this manner, the sample/hold circuit 10 is maintained in a "hold" mode for the duration of the incoming command signal pulse. When, however, the command signal pulse ceases, output from amplifier 40 will switch high to bias transistor 36 on, transferring the voltage stored on memory capacitor 4 from amplifier 32 through transistor 36 to amplifier 38. An RC network 37 at the input to amplifier 38 may be employed to establish a time constant in the output of amplifier 38, limited the rate of acceleration seen by stepping motor 16 should the width of any one command signal pulse increase over that associated with the previous command signal pulses.

The sampled voltage from sample/hold circuit 10 is directed to voltage-to-frequency converter 12 for the purpose of generating the motor control signal. To this end, voltage-to-frequency converter includes amplifier 42, exponential amplifier 44, and amplifiers 46 and 48. Amplifier 44 performs the basic logarithmic amplification of the capacitor voltage. A resistor 50 at the input to amplifier 44 sets the slope constant for this exponential amplification. A potentiometer 52 operates in conjunction with amplifier 42 to establish the input offset for amplifier 44, and thus the starting point of the exponential curve characteristic of the transfer function performed by amplifier 44. The ability to adjust the resistive value of potentiometer 52 furnishes a means for trimming the output of the voltage-to-frequency converter 12 until a desired signal frequency is reached for a given command signal pulse width. Amplifiers 46 and 48 are arranged in an integrator/comparator type oscillator configuration, whereby a pulse train having a frequency exponentially related to the width of the most recent command signal pulse is output from amplifier 48. This pulse train, which serves as the motor control signal, drives a counter 54 such as a CD-4022/8 counter in stepping motor driver 14. Counter 54 in turn outputs a series of properly phased drive signals which alternately gate a series of drive transistors 56 to energize the windings (not shown) in stepping motor 16. If desired, a reversing switch can be connected intermediate to counter 54 and drive transistors 56 to enable reversal of the stepping motor operating direction.

The turn-off circuitry 18 used in conjunction with the present invention may be seen to best advantage by returning to FIG. 2A. Turn-off circuitry 18 includes a group of amplifiers 60, 62, 64, and 66 interconnected with a pair of capacitors 68, 70. The positive input of amplifier 60 as well as the negative input of amplifier 62 are connected to the output of amplifier 28. It will be recalled that amplifier 28 serves as a gate for current source 6, switching on while each incoming command signal pulse is present at opto-isolator 20. The value of capacitor 68 in the input of amplifier 60 is selected such that capacitor 68 can not charge to a point where output of amplifier 60 switches high, as long as the command signal pulse width is within a predetermined "normal" range. Consequently, under "normal" pulse conditions, the output of amplifier 60 remains low, the output of amplifier 38 in sample/hold circuit 10 is positive to turn off amplifier 64 and the only source charge available to capacitor 70 at the negative input of amplifier 66 is through resistor 72. The value of resistor 72 is such that the voltage appearing at the negative input to amplifier 66 during "normal" command signal pulses forces the open collector output of the amplifier to float until reaching the level at the positive input to amplifier 38. If, however, a command signal pulse having a width substantially wider than normal is received at opto-isolator 20, the increased gating time for current source 6 charges capacitor 68 until the output from amplifier 60 switches high, whereupon a large quantity of charge is dumped into capacitor 70. This latter quantity of charge forces the output of amplifier 66 to the negative rail, pulling the positive input of amplifier 38 down until the output of amplifier 38 switches negative to turn transistor 74 on. Transistor 74, which is connected to the bases of the drive transistors 56, then cuts off all drive current to the drive transistors, disabling the stepping motor 16 to stop pump operation. The negative output from amplifier 38 is also returned to the negative input of amplifier 64, forcing the output of amplifier 64 positive to supply a continuous "topping off" current to capacitor 70. In this manner, a positive feedback "latch" is established to prevent re-energization of the drive transistors 56 until a command signal pulse within the "normal" range is received. Amplifier 62 functions to clear out capacitor 70 as each new incoming command signal pulse arrives at opto-isolator 20. The time constant established by RC network 37 at the input to amplifier 38 slows the response of amplifier 38 to prevent the output of amplifier 64 from switching low while each incoming command signal pulse is present at opto-isolator 20, thereby allowing the system to "examine" every command signal pulse to ensure that the pulse width is within "normal" limits before the feedback "latching" effect created by amplifier 64 is removed. Accordingly, although it is unnecessary for the computer to send successive "shut down" pulses to the pump controller for the purpose of maintaining a shut down condition, the appearance of such successive "shut down" length pulses cannot result in the energization of stepping motor 16 for even a brief period.

Figure 3:
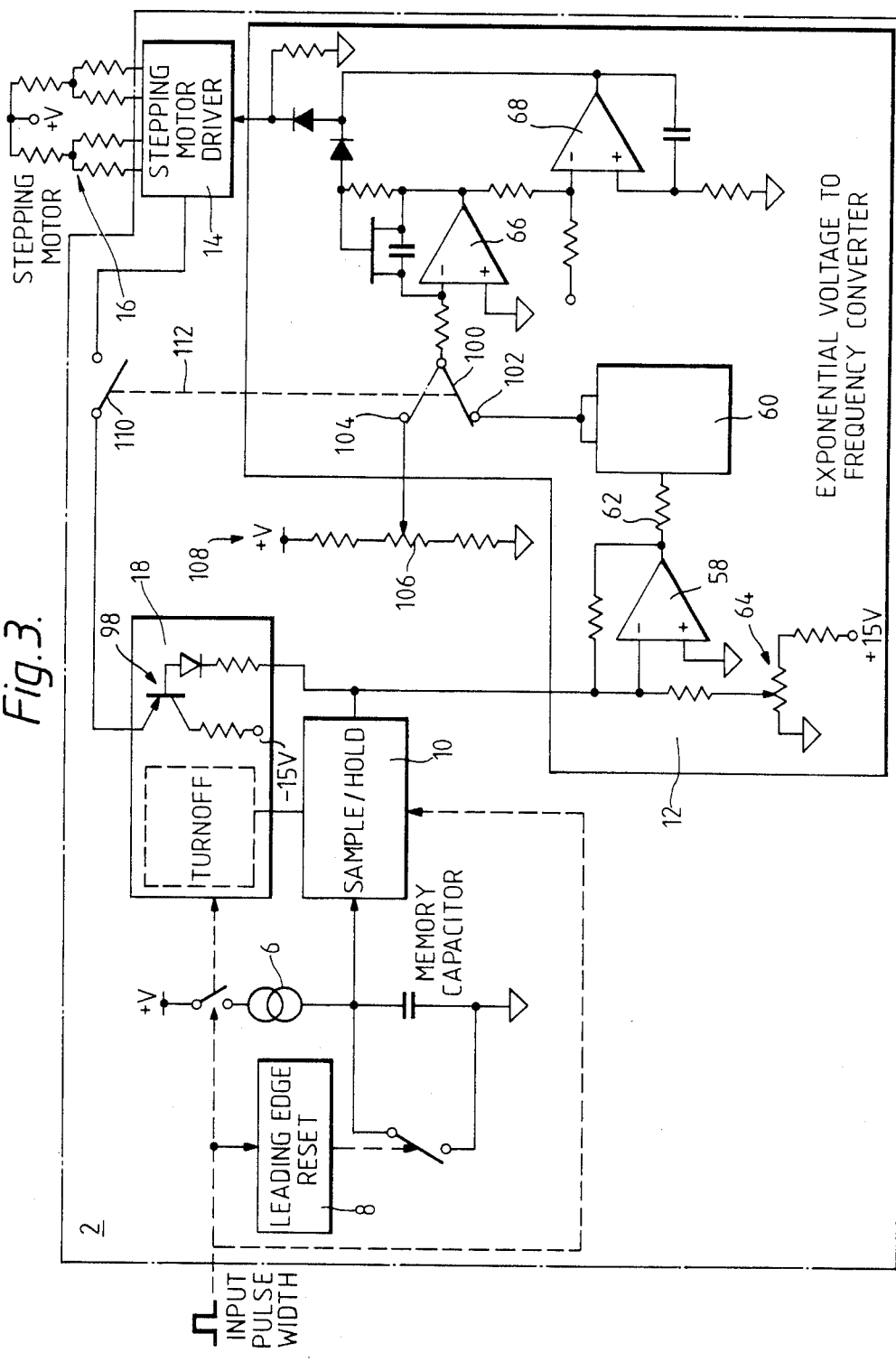
FIG. 3 is a diagram of the mechanism to switch from automatic to manual mode.

If desired, the analog motor controller 2 of the present invention may include a circuit feature for shifting the operation of the controller from the aforementioned automatic or command signal pulse width-initiated mode to a manual mode. In the manual mode of controller operation, an adjustable voltage from an independent voltage source is employed by the voltage-to-frequency converter 12 to generate the motor control signal, permitting regulation of the pump stepping motor speed without regard to the computer-calculated R value or associated command signal pulse width. FIG. 3 illustrates the mechanism utilized to perform the automatic mode to manual mode switch. FIG. 3 components corresponding to components in FIGS. 1, 2A and 2B are assigned like reference numerals. Hence, operational amplifier 58, logarithmic amplifier 60 and operational amplifiers 66 and 68 of voltage-to-frequency converter 18 may all be seen in FIG. 3. A switch element 100 is connected to operational amplifier 66 for movement between an automatic mode terminal 102 which receives the output of logarithmic amplifier 60 and a manual mode terminal 104 which receives the output of a variable resistor 106. Variable resistor 106 is tied to a voltage source 108. During automatic controller operation, switch element 100 occupies the solid line position in FIG. 3, enabling the output of logarithmic amplifier 60 to drive the operational amplifiers 66 and 68 in oscillatory fashion as described hereinabove. During manual controller operation, switch element 100 is shifted to the dotted line position shown in FIG. 3 and operational amplifier 66 is instead supplied with voltage from voltage source 108 through variable resistor 106. Amplifiers 66 and 68, which remain interconnected in an integrator/comparator-type oscillator configuration, then output a control signal having a frequency proportional to the voltage level established by variable resistor. This control signal is directed to the stepping motor driver 20, where it is used to drive the pump stepping motor 6 as also described hereinabove. The speed at which the pump stepping motor is driven in the manual mode can be changed by simply adjusting variable resistor 106 to achieve the command signal frequency necessary for driving the motor at the desired speed. An additional switch element 110 is placed in the circuit connection between turnoff circuit 22 and stepping motor driver 20. Specifically, switch element 110 is positioned between transistor 98 of turnoff circuit 20 and the bases of the drive transistors 56 in stepping motor driver 14. A mechanical interlink 112 between switch element 100 and switch element 110 actuates switch element 110 when switch element 100 is moved to the manual mode terminal 104, producing an open-circuit condition between transistor 98 and the drive transistor bases which prevents computer 2 (not shown in FIG. 3) from accidentally deenergizing the pump stepping motor during manual mode operation.

The present invention has been set forth in the form of two perferred embodiments. It is nevertheless understood that modifications to the disclosed pump control system may be made by those skilled in the art without departing from the spirit and scope of the present invention. In particular, the various hardware components of the analog motor controller can be replaced partially or in their entirety by appropriately-designed software routines carried out by a microprocessor or the like. The command signal pulses generated by the computer employed in the present invention could, for example, be used to gate a clocking device for the purpose of deriving a digital count signal having a binary value equivalent to the width of the command signal pulses. A pulse width-to-time conversion could thereafter be performed in accordance with the principles of the present invention by exponentiating the digital count signal to obtain a binary output signal which is exponentially related to the command signal pulse width. A variety of software schemes for implementing such an exponentiating function will be apparent to those skilled in the art. The binary output signal would, of course, be used to drive an oscillator or the like for the purpose of generating a pulse train having a frequency proportional to the value of the binary output signal. The pulse train can function as a motor control signal in a manner analogous to that of the motor control signal output from voltage-to-frequency converter 12 in analog motor controller 2. The requisite amount of vernier-type control over pump motor acceleration and deceleration could be obtained in a software oriented motor control system by regulating the rate of change of oscillator pulse train through additional software manipulation of the binary output signal, again using software techniques well known to those skilled in the art. The noise immunity provided by the opto-isolator 24 in the analog motor controller can be duplicated in a software controller by utilizing self-checking software routines to perform the exponentiating and related signal value-to-frequency transfer and/or conversion functions.

Given the wide variety of circuit variations and programming permutations available for constructing a working embodiment of the present invention, it is the intention of the inventors to be covered only by the limitations of the following claims:

We claim:

1. Apparatus for driving a motor at a desired motor speed, said apparatus comprising:
   means for generating a command signal having a preselected pulse width which varies logarithmically with said desired motor speed;
   means connected to receive said command signal for generating a control signal which has a preselected control component exponentially related to said command component of said command signal;
   means connected to receive said control signal and for translating the control signal into said desired motor speed, which speed is directly proportional to said control component of said control signal.

2. Apparatus for driving a motor at a desired motor speed, said apparatus comprising:
   means for generating a command signal having a preselected pulse width which varies logarithmically with said desired motor speed;
   means connected to receive said command signal for generating a control signal which has a preselected control component exponentially related to said command component of said command signal;
   means connected to receive said control signal and for translating the control signal into said desired motor speed, which speed is directly proportional to said control component of said control signal;
   said means connected to receive said command signal including a charge storage means for accumulating voltage, a source means for supplying voltage to said charge storage means as a function of said component of said command signal and a means for sampling the voltage so accumulated on said charge storage means.

3. Apparatus for driving a motor at a desired motor speed, said apparatus comprising:
   means for generating a command signal having a preselected pulse width which varies logarithmically with said desired motor speed;
   means connected to receive said command signal for generating a control signal which has a preselected control component exponentially related to said command component of said command signal;
   means connected to receive said control signal and for translating the control signal into said desired motor speed, which speed is directly proportional to said control component of said control signal;
   circuit means for sensing said component of said command signal and for shutting off the motor when said component of said command signal reaches a predetermined limit.

4. An apparatus as set forth in claim 2, wherein said means connected to receive said command signal further includes means for sampling said voltage stored on said charge accumulating means.

5. An apparatus as set forth in claim 3, wherein said circuit means includes a comparator which changes state when said characteristic of said command signal exceeds said predetermined limit.

6. An apparatus as set forth in claim 5, wherein said circuit means further includes means for locking the output of said comparator in a first state when said component of said command signal exceeds said predetermined limit.

7. An apparatus as set forth in claim 6, wherein said circuit means includes a gating means which cuts off operating power to the motor when the output of said comparator is in said first state.

8. Apparatus as set forth in claim 1, wherein said means connected to receive said command signal includes a charge storage means for accumulating voltage, a source means for supplying voltage to said charge storage means as a function of said pulse width and a means for sampling the voltage so accumulated on said charge storage means.

9. An apparatus as set forth in claim 1, further including circuit means for sensing said component of said command signal and for shutting off the motor when said component of said command signal reaches a predetermined limit.

10. An apparatus for supplying a controlled amount nutrients to cell cultures, comprising:
    a pump driven by a motor for supplying nutrients to cell culture;
    means for applying a control signal to said motor, said control signal having a preselected control component directly proportional to the speed of said motor whereby nutrients are supplied in controlled amounts to said cell culture;
    means for generating said control signal in response to a command signal having a preselected command component which is a logarithmic function of said control component of said control signal.

11. The apparatus of claim 10 wherein the motor is a stepping motor and the control signal is pulsed direct current.

12. The apparatus of claim 10 which includes a means for converting the command signal into a voltage.

13. The apparatus of claim 12 which includes a means for converting the voltage into a frequency which is an exponential function of the voltage.

14. A method for governing the operation of a motor to achieve a desired motor speed, said method comprising the steps of:
    generating a command signal having a pulse width logarithmically related to said desired motor speed;
    converting said command signal into a control signal having a frequency exponentially related to said component of said command signal; and
    driving said motor at a speed proportional to the frequency of the control signal.

* * * * *